(12) United States Patent
Lee et al.

(10) Patent No.: US 9,228,614 B2
(45) Date of Patent: Jan. 5, 2016

(54) JOINT ASSEMBLY

(75) Inventors: In-Woo Lee, Daegu (KR); Ho-Chul Son, Daegu (KR); Hyun-Chul Kim, Gyeongbuk (KR); Sung-Bong Kim, Daegu (KR); Moo-Young Park, Daegu (KR); Se-Hun Jung, Daegu (KR)

(73) Assignee: KOREA DELPHI AUTOMOTIVE SYSTEMS CORPORATION, Daegu (KR)

( * ) Notice: Subject to any disclaimer, the term of this patent is extended or adjusted under 35 U.S.C. 154(b) by 0 days.

(21) Appl. No.: 14/119,601

(22) PCT Filed: Apr. 9, 2012

(86) PCT No.: PCT/KR2012/002685
§ 371 (c)(1),
(2), (4) Date: Nov. 22, 2013

(87) PCT Pub. No.: WO2012/161418
PCT Pub. Date: Nov. 29, 2012

(65) Prior Publication Data
US 2014/0113734 A1     Apr. 24, 2014

(30) Foreign Application Priority Data
May 24, 2011 (KR) .................... 10-2011-0049026

(51) Int. Cl.
*F16D 3/26* (2006.01)
*F16D 3/30* (2006.01)
(Continued)

(52) U.S. Cl.
CPC .. *F16D 3/26* (2013.01); *F16D 3/30* (2013.01); *F16D 3/32* (2013.01); *F16D 3/33* (2013.01)

(58) Field of Classification Search
CPC ............... F16D 3/26; F16D 3/30; F16D 3/32; F16D 3/33

USPC .................... 464/11, 117, 118, 134, 136, 905
See application file for complete search history.

(56) References Cited

U.S. PATENT DOCUMENTS

| 4,257,243 | A |   | 3/1981 | Herchenbach |
| 4,505,689 | A | * | 3/1985 | Mazziotti |

(Continued)

FOREIGN PATENT DOCUMENTS

| JP | 44-29327   | * 11/1969 | .................... 464/118 |
| JP | H0-47362 A |   2/1998  | |

(Continued)

OTHER PUBLICATIONS

Universal Joint and Driveshaft Design Manual, AE-7, Society of Automotive Engineers Inc., Warrendale, PA, pp. 103-118, TJ1079. S62 1979.*

(Continued)

*Primary Examiner* — Gregory Binda
(74) *Attorney, Agent, or Firm* — Novick, Kim & Lee, PLLC; Jae Youn Kim (57) ABSTRACT

A constant-velocity joint assembly includes: a first and a second shaft portions respectively provided with a protrusion; a double yoke portion in which a guide hole is formed along an axis direction, the first and the second shaft portions being respectively rotatably connected to both sides of the guide hole with an axis of an upper/lower direction; and a guide portion which is disposed to the guide hole to guide the protrusion and rotates along an inner circumference of the guide hole during rotation of the shaft portions, wherein the first and the second shaft portions respectively comprises: a spider body, a left and a right leg, and an upper and a lower legs; a shaft provided with the protrusion; and a yoke block comprising a block body, and a left and a right connecting member.

15 Claims, 6 Drawing Sheets

(51) Int. Cl.
*F16D 3/32* (2006.01)
*F16D 3/33* (2006.01)

(56) References Cited

U.S. PATENT DOCUMENTS

| | | |
|---|---|---|
| 5,433,667 A | 7/1995 | Schafer et al. |
| 5,525,110 A | 6/1996 | Riccitelli et al. |
| 6,840,864 B2 | 1/2005 | Dupuie et al. |
| 7,029,398 B1 * | 4/2006 | Burnard ............... 464/134 |

FOREIGN PATENT DOCUMENTS

| | | |
|---|---|---|
| KR | 10-0351402 B1 | 11/2002 |
| KR | 10-0854762 B1 | 8/2008 |

OTHER PUBLICATIONS

Universal Joint and Driveshaft Design Manual. AE-7, Society of Automotive Engineers Inc., Warrendale PA, p. 62, TJ1079.S62 1979.*

* cited by examiner

JOINT ASSEMBLY

TECHNICAL FIELD

The present invention relates to a constant-velocity joint assembly applied to a drive shaft of a vehicle.

BACKGROUND ART

U.S. Pat. No. 6,840,864 has been introduced as a double cardan constant-velocity joint assembly.

In a conventional constant-velocity joint assembly a leg portion, i.e., a cross pin which is coupled to a yoke block, i.e., an inner ring is directly connected to a front end of a shaft, so a freedom degree of a front end of a shaft becomes lower so that an improvement of an operation performance is limited. In addition, there are problems in that a productability is deteriorated due to a connection structure and a size of a package becomes larger.

Further, a conventional constant-velocity joint assembly has a limit in a smooth operation of a shaft to an intermediate coupling member due to a structure of an intermediate coupling member. Accordingly, it is needed to change a structure of an intermediate coupling member of a conventional constant-velocity joint assembly to improve performance.

DETAILED DESCRIPTION OF THE INVENTION

Technical Problem

The present invention has been made in an effort to provide a constant-velocity joint assembly in which a productability has been improved so as to obtain a price competitiveness, and a size of a package can be reduced, and an operation performance can be substantially enhanced.

Technical Solution

According to an exemplary embodiment of the present invention, a constant-velocity joint assembly includes: a first and a second shaft portions respectively provided with a protrusion; a double yoke portion in which a guide hole is formed along an axis direction, the first and the second shaft portions being respectively rotatably connected to both sides of the guide hole with an axis of an upper/lower direction; and a guide portion which is disposed to the guide hole to guide the protrusion and rotates along an inner circumference of the guide hole during rotation of the shaft portions, wherein the first and the second shaft portions respectively comprises: a spider body to which a spider hole is formed, a left and a right leg which are respectively protruded in a left and a right directions from the spider body, and an upper and a lower legs which are respectively protruded in an upward and a downward direction from the spider body to be connected to the double yoke portion; a shaft provided with the protrusion; and a yoke block comprising a block body in which a block hole is formed and is connected to the shaft by the protrusion passing through the block hole, and a left and a right connecting member which are respectively protruded from the left and the right sides of the block body and are respectively provided with a connecting hole to which the left and the right legs are rotatably connected.

The double yoke portion may include: a double yoke body to which the guide hole is formed; and an upper and a lower connecting member which are respectively protruded to both sides of the guide hole from an upper and a lower side of the double yoke body and are respectively provided with a connecting hole to which the upper and the lower legs are rotatably connected.

The left and the right legs may be protruded from the spider body to be shorter than the upper and the lower legs.

The shaft and the yoke block may be independently formed and assembled.

The spider may further include needle bearings which are respectively disposed between the left and the right legs and the connecting hole of the left and the right connecting members and between the upper and the lower legs and the connecting hole of the upper and the lower connecting members.

The guide portion may include a guide block which is provided with a guide passage along an axis direction to enclose and guide the respective protrusions.

The guide passage may be formed at a position where the respective protrusions can be enclosed in accordance with an angle between the first and the second shaft portions and the double yoke portion.

The guide portion may include a lubricative bushing portion which is interposed between the guide hole and the guide block.

The guide portion may include a rubber bushing portion which is interposed between the guide hole and the guide block.

The rubber bushing may include: an inner tube which encloses an outer circumference of the guide block; a rubber bushing which encloses an outer circumference of the inner tube; and an outer tube which encloses an outer circumference of the rubber bushing.

The guide portion may further include a lubricative bushing portion which is interposed between the guide hole and the rubber bushing portion.

The lubricative bushing portion may include: a thrust bearing which encloses the rubber bushing portion; a lubricative plate which is provided to enclose an outer circumference of the thrust bearing and to contact an inner circumference of the guide hole and comprises a protrusion member which extends radially inwardly along a circumference at one end to enclose a circumference of one side surface of the rubber bushing portion; and a washer which encloses a circumference of the other side surface of the rubber bushing portion.

A guide bushing may be disposed inside the guide passage.

An elastic member may be disposed between the respective protrusions inside the guide passage.

A guide bearing which has a shape of being capable of guiding rotation of the respective protrusions may be interposed between the respective protrusions inside the guide passage.

A spider rubber bushing may be disposed inside the spider hole.

Grooves may be respectively formed on both sides of the guide portion in the guide hole, and wherein the double yoke portion comprises stopper members which are respectively inserted to the respective grooves to fix the position of the guide portion.

The groove may be formed along a circumferential direction on an inner circumference of the guide hole, and the stopper member has a ring shape in which a portion thereof is removed so as to have a slot.

Advantageous Effects

According to the present invention, since the protrusion of the shaft passes through the spider hole and is housed in the guide portion which is provided inside the double yoke portion, instead of being directly connected to the spider and the spider is formed independently from the shaft and is provided such that the rotation axis (left/right and upper/lower legs) are rotatably connected to the yoke block and the double yoke portion, the operational performance of the constant-velocity joint assembly can be improved and at the same time the assembling and manufacturing characteristics can be improved so as to obtain a price competitiveness.

In addition, since the shape of the spider is non-symmetrical, a size of the package can be reduced while avoiding interference between the yoke block and the double yoke portion, and since the shaft and the yoke block can be independently formed and then assembled, the productability can be improved.

In addition, since the lubricative bushing portion and the rubber bushing portion are provided to the guide portion which is disposed inside the double yoke portion, the protrusion of the shaft can be guided while smoothly rotating, and vibration during operation can be absorbed, and accordingly the operational stability and the performance of the constant-velocity joint assembly can be substantially enhanced.

In addition, since the lubricative plate and the protrusion member are combined with the stopper member, the guide portion can be prevented from separating and clearance in an axis direction can be removed so that vibration to an axis direction can be prevented.

BRIEF DESCRIPTION OF DRAWINGS

FIG. 4A is a front view, FIG. 4B is a left side view.

DETAILED DESCRIPTION OF THE EMBODIMENTS

Embodiments of the present invention will be described hereinafter with reference to the accompanied drawings.

Referring to FIG. 1 to FIG. 5, a constant-velocity joint assembly according to an embodiment of the present invention (hereinafter referred to "the constant-velocity joint assembly") includes a first and a second shaft portion 1 and 1a.

The first and the second shaft portion 1 and 1a are respectively provided with a protrusion 121.

In more detail, the first and the second shaft portions 1 and 1a include a spider 11, a shaft 12 and a yoke block 13, respectively. Hereinafter, common components for the first and the second shaft portions 1 and 1a will be explained together.

Referring to FIG. 1 to FIG. 5, the spider 11 may include a spider body 111 to which a spider hole 1111 is formed, a left and a right legs 112 which are respectively protruded in a left and a right directions from the spider body 111, and an upper and a lower leg 113 which are respectively protruded in an upward and a downward directions from the spider body 111 to be connected to a double yoke portion 2.

A protrusion 121 of the shaft 12, which will be described later, passes through the spider hole 1111 and is housed to a guide portion 3 (a guide passage 311). In addition, the left and the right legs 112 are rotatably inserted into a connection hole 1321 of the yoke block 13 to be connected, and the upper and the lower legs 113 are rotatably inserted into a connection hole 221 of a double yoke body 21 to be connected.

Since the protrusion 121 of the shaft 12 is provided to pass the spider hole 1111 in a state of without being directly connected to the spider 11, an end of the protrusion 121 of the shaft 12 can be more freely guided in a state of being housed to the guide portion 3, so an operation performance of the constant-velocity joint assembly can be improved, and in addition characteristics of assembling and manufacturing can also be improved so as to obtain a price competitiveness.

Further, in an aspect that the spider 11 is separately formed from the shaft 12 and the rotating shafts (left and right legs 112, and upper and lower legs 113) are rotatably connected to the yoke block 13 and the double yoke 2, each component and connections thereof can be simplified, so characteristics of assembling and manufacturing can also be improved so as to obtain a price competitiveness.

Here, the left/right directions and the upward/downward directions may be directions which are defined with reference to a shaft direction (a direction to which the spider hole 1111 passes). That is, when seeing a shaft direction of the spider 11, an upward and a downward direction are the upward and the downward directions, and a left and a right direction are the left and the right directions. For example, when seeing in (a) of FIG. 2 an upward and a downward direction is the left and the right direction, and when seeing in FIG. 3 and FIG. 4 an upward and a downward direction are the upward and the downward directions. Further, in FIG. 5, directions of two o'clock and eight o'clock with reference to the spider 11 of the first shaft portion 1 are the upward and the downward directions, and directions of six o'clock and twelve o'clock are the left and the right directions.

For reference, since the upward/downward directions and the left/right directions are determined with reference to the axis direction, the upward/downward directions may be the left/right directions according to the displacement state and the rotation state when being seen from the outside, and the left/right directions may be an oblique direction. This may also be similarly applied to the description below.

Further, referring to FIG. 1 to FIG. 5, the spider 11 may further include needle bearings 114 which are respectively disposed between the left and the right legs 112 and the connection hole 1321 of a left and a right connecting member 132, and the upper and the lower legs 113 and the connection hole 221 of the upward/downward connecting member 22. The needle bearing 14 may improve the stability of operation of the spider 11. In addition, since the respective rotation shafts (the left/right and upper/lower legs 112 and 113) of the spider 11 are connected to the yoke block 13 and the double yoke portion 2 via the needle bearing 114, the assembling can be easily done so as to improve the productability. Exemplarily, the needle bearing 114, as shown in FIG. 1 to FIG. 5, may have a shape of a cap which encloses the outer circumference of the left/right legs 112 and the upper/lower legs 113 and at the same time covers the ends thereof.

At this time, a shape of the spider 11, that is, the left/right legs 112 and the upper/lower legs 113 are formed to be asymmetric, so the interference between the yoke block connected to the left/right legs 112 and the double yoke portion 2 connected to the upper/lower legs 113 can be avoided and at the same time a size of the package (the constant-velocity joint assembly 100) can be reduced.

Figure 1:
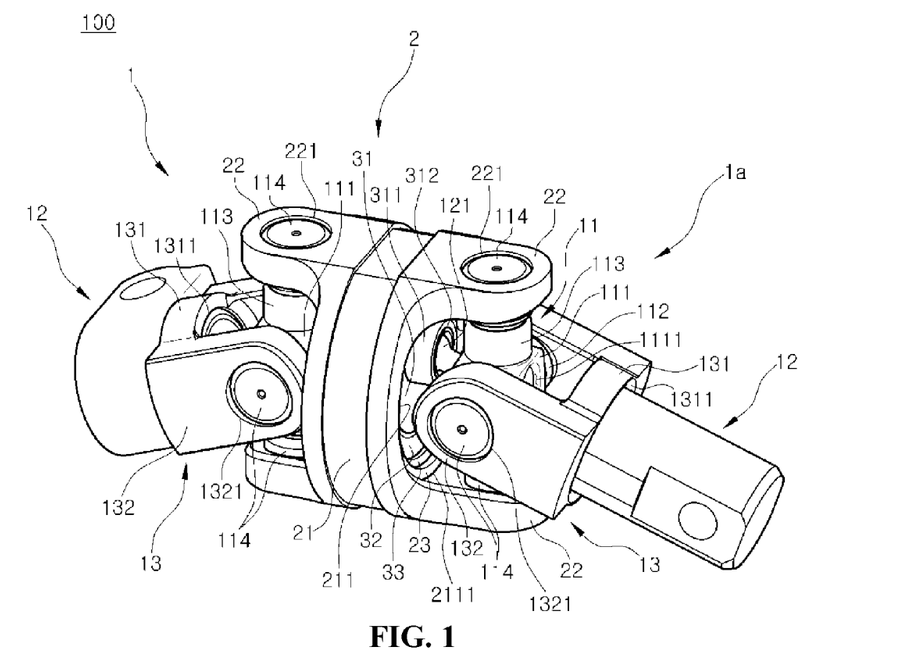
FIG. 1 is a perspective view of a constant-velocity joint assembly according to an embodiment of the present invention.
Figure 2A:
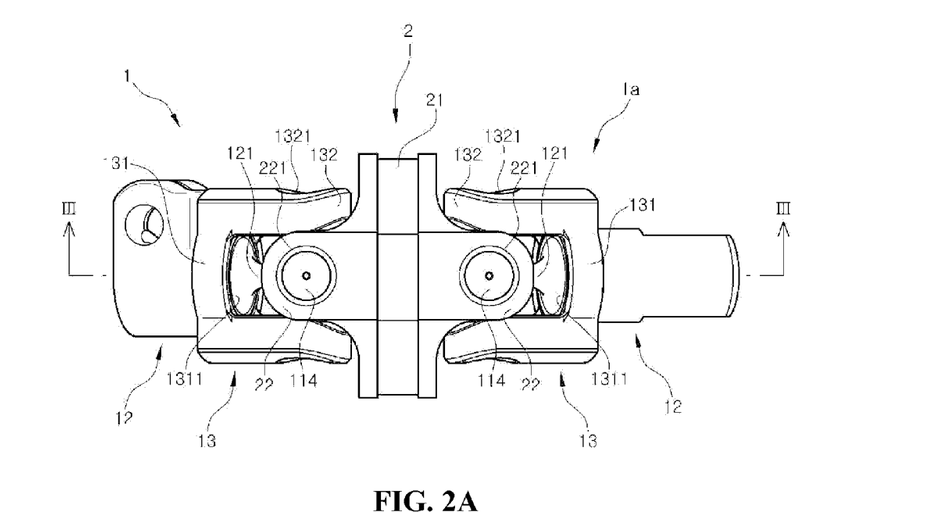
FIG. 2A is a top view and a perspective view of a constant-velocity joint assembly according to an embodiment of the present invention.
Figure 2B:
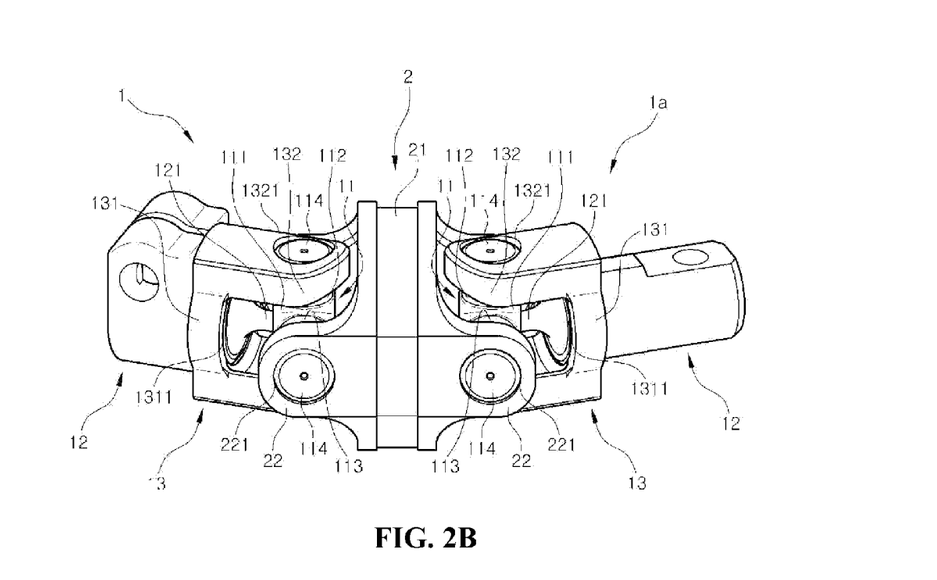
FIG. 2B is another perspective view of the joint assembly of FIG. 2A.
Figure 5:
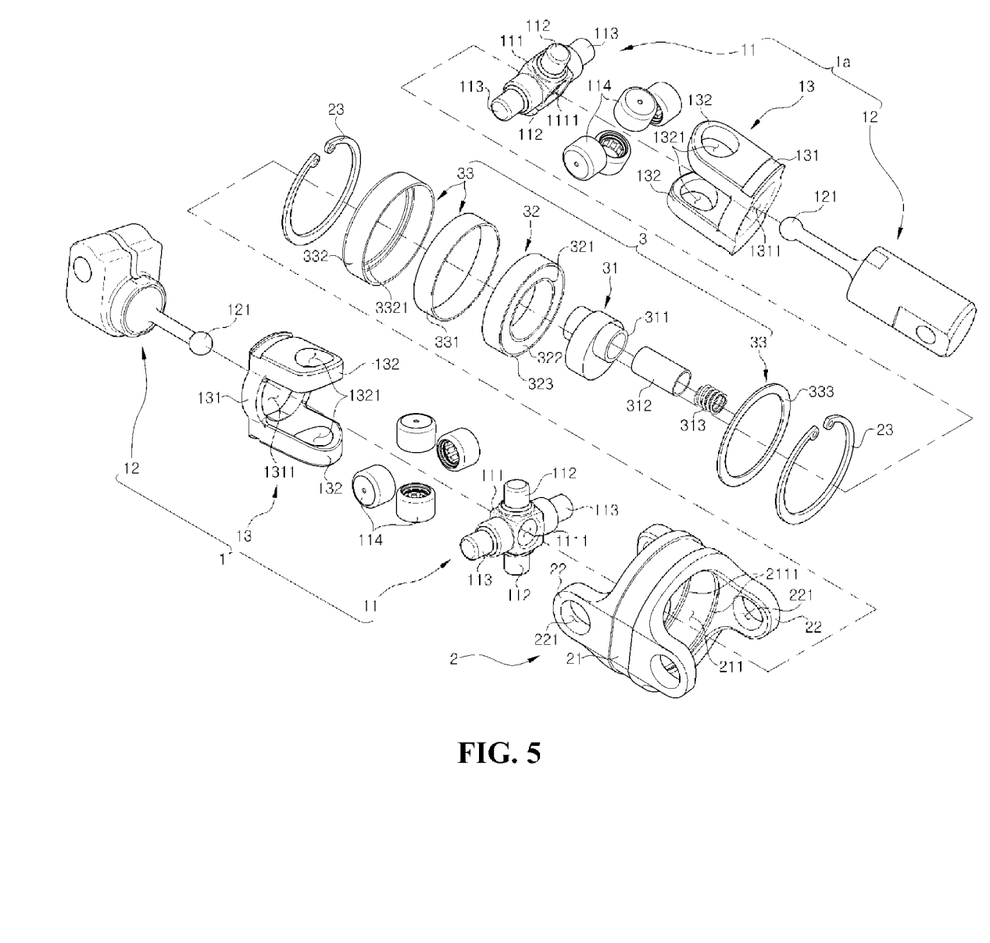
FIG. 5 is an exploded perspective view of a constant-velocity joint assembly according to an embodiment of the present invention.

Exemplarily, as shown in FIG. 5, the left/right legs 112 may be protruded to be shorter than the spider body 111. Referring to FIG. 1, FIG. 2, and (b) and (c) of FIG. 4, the left/right legs 112 are formed to be shorter than the upper/lower legs 113, so even when the yoke block 13 rotates in a left/right direction with reference to the upper/lower legs 113 in (b) and (c) of FIG. 4, the yoke block 13 cannot interfere with the double yoke portion 2, and a size of the package can be reduced.

Further, the shaft 12 may be provided with the above-described protrusion 121.

Figure 3A:
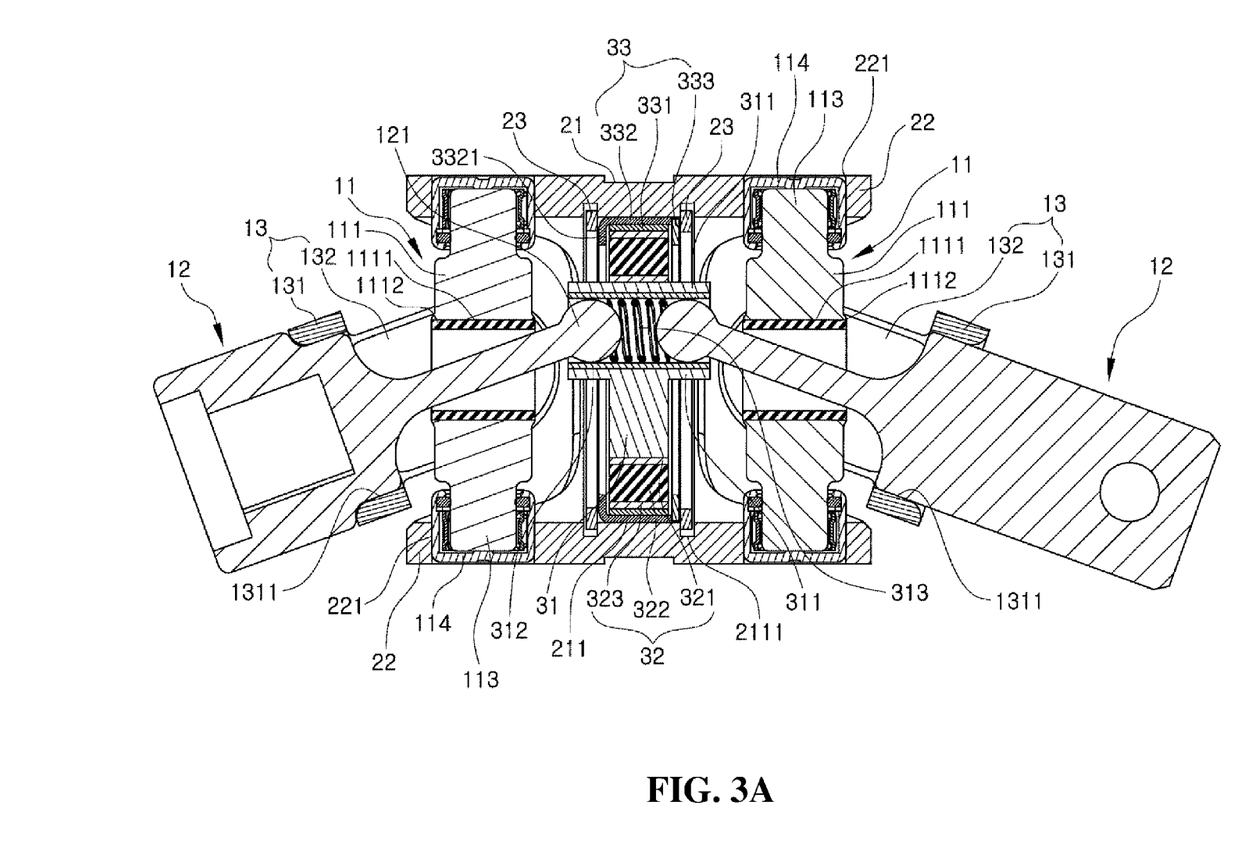
FIG. 3A is a sectional view taken along a line III-III of FIG. 2.
Figure 3B:
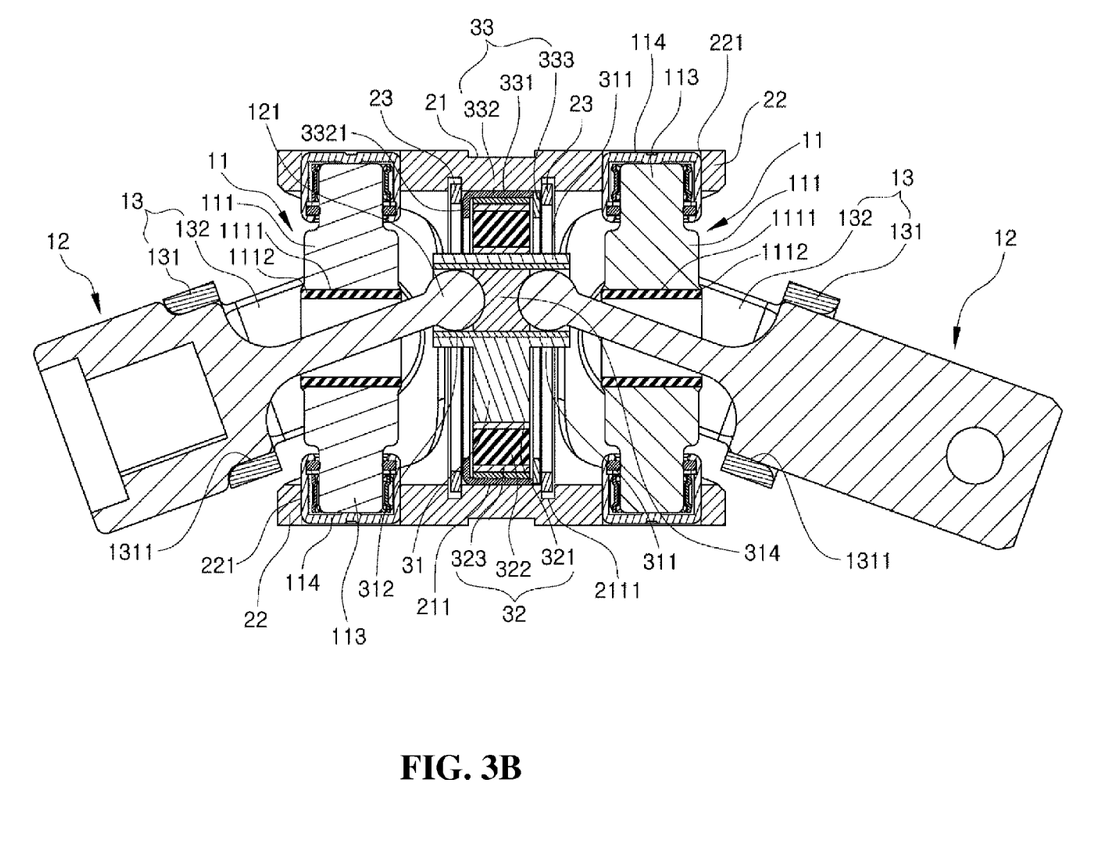
FIG. 3B is a sectional view of another embodiment of the joint assembly of FIG. 2 taken along the line III-III.
Figure 4A:
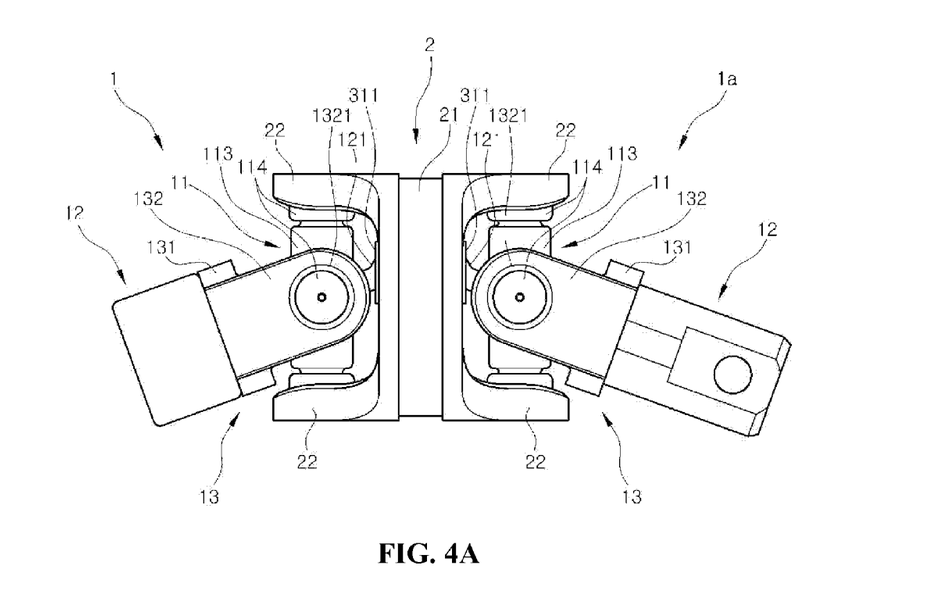
Figure 4B:
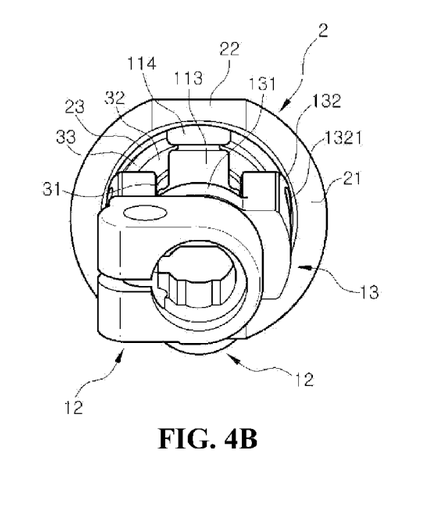
Figure 4C:
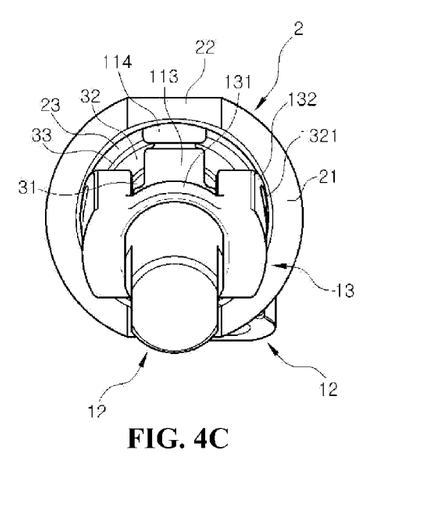
FIG. 4C is a right side view of a constant-velocity joint assembly according to an embodiment of the present invention.

Referring to FIG. 3 and FIG. 5, the protrusion 121 has a shape of a protruded rod, and a frontal end portion thereof may be formed in a shape of a ball. In addition, a section of the rod shape may have a shape of a circle. The protrusion 121, as shown in FIG. 1 and FIG. 3, is partially housed in the guide passage 311 of the guide block 31, so the rotation of the first and the second shaft portions 1 and 1a and the double yoke portion 2 about the guide portion 3 can be stably guided.

Further, the yoke block 13 may include a block body 131 and the left/right connecting member 132.

Referring to FIG. 1 to FIG. 5, a block hole 1311 may be formed in the block body 131, and referring to FIG. 2 to FIG. 5, the protrusion 121 passes through the block hole 1311 so that the yoke block 13 and the shaft 12 can be connected to one another.

In addition, the left/right connecting member 132 may be protruded respectively from the left and right sides of the block body 131 toward an axis direction. Further, referring to FIG. 1, FIG. 2, FIG. 4, and FIG. 5, connecting holes 1321 may be respectively formed to the left/right connecting member 132 such that the left/right legs 112 are rotatably connected thereto. Here, an axis direction means an axis direction of the yoke block 13, that is, a direction in which the block hole 1311 is perforated. An axis direction which is a protrusion direction of the left/right connecting member 132 may means a direction opposite to a direction in which the block body 131 is connected to the shaft 12.

As described above, while the protrusion 121 passes through the block hole 1311, the shaft 12 can be connected to the block body 131, and as shown in FIG. 5, the shaft 12 and the yoke block 13 are independently formed and assembled. Due to independent forming and assembling, the productability can be improved.

Further, referring to FIG. 1 to FIG. 5, the constant-velocity joint assembly 100 includes the double yoke portion 2.

A guide hole 211 is formed to the double yoke portion 2 along an axis direction. Further, the first and the second shaft portions 1 and 1a are respectively rotatably connected to both sides of the guide hole 211 with an axis of an upper/lower direction. Here, referring to FIG. 1 to FIG. 5, the both sides of the guide hole 211 means both sides along an axis direction in which the guide hole 211 is perforated.

Exemplarily, referring to FIG. 1 to FIG. 5, the double yoke portion 2 may include a double yoke body 21 to which the guide hole 211 is formed. The guide portion 3, which will be described later, may be connected to the guide hole 211.

In addition, the double yoke portion 2 may include upper/lower connecting members 22 which are respectively protruded toward both sides of the guide hole 211 from an upper side and a lower side of the double yoke body 21 and are respectively provided with connecting holes 221 such that the upper/lower legs 113 can be rotatably connected thereto.

That is, the upper/lower connecting member 22, as shown in the drawings, are respectively protruded from the upper side of the double yoke body 21 to both sides of the guide hole 211, and are respectively protruded from the lower side of the double yoke body 21 to both sides of the guide hole, so as to be provided with four.

Referring to FIG. 3 and FIG. 5, the constant-velocity joint assembly 100 includes the guide portion 3.

The guide portion 3 is disposed in the guide hole 211 within the double yoke portion 2 to guide the protrusion 121. Further, the guide portion 3 rotates along an inner circumference of the guide hole 211 when the first and the second shaft portions 1 and 1a rotate. The guide portion 3 is provided for an improvement of the performance of the constant-velocity joint assembly, and when the first and the second shaft portions 1 and 1a rotate together with the double yoke portion 2 which is connected via the upper/lower legs 113, the guide portion 3 rotates in a state of holding the protrusion 121 of the shaft 12 relatively to the double yoke portion 2, so the double yoke portion 2 can rotate more smoothly so that the operation performance thereof can be improved.

Further, referring to FIG. 1 and FIG. 3 to FIG. 5, the guide portion 3 may include the guide block 31 in which guide passages 311, which hold and guide the respective protrusions 121, are formed along an axis direction. Exemplarily, as shown in FIG. 3 and FIG. 5, the guide passage 311 may be realized by a member protruding in both directions along an axis direction from the guide block 31 and being provided with a passage therein. Since the protrusion 121 is housed within the guide passage 311 as shown in FIG. 3, the protrusion 121 can be guided such that an angle between the first and the second shafts 1 and 1a and the double yoke portion 2 can be maintained when the first and the second shaft portions 1 and 1a and the double yoke portion 2 rotate.

The guide passage 311 may be formed at a position where the respective protrusions 121 can be housed in accordance with an angle between the first and the second shaft portions 1 and 1a and the double yoke portion 2. Exemplarily, as shown in FIG. 3 and FIG. 5, the guide passage 311 may be formed to be leaned to the upper side from the center of the guide block 31. Referring to FIG. 3, by adjusting the leaned position of the guide passage 311 from the center of the guide block 31, an angle between the first and the second shaft portions 1 and 1a and the double yoke portion 2 can be regulated.

Further, referring to FIG. 1, FIG. 3 and FIG. 5, the guide portion 3 may include a rubber bushing portion 32 which is interposed between the guide hole 211 and the guide block 31. By the rubber bushing portion 32, vibration (i.e., upper/lower vibration) with respect to a direction perpendicular to an axis direction of the double yoke portion 2 during rotation can be absorbed.

In addition, referring to FIG. 3 and FIG. 5, the rubber bushing portion 32 may include an inner tube 321 which encloses an outer circumference of the guide block 31, a rubber bushing 32 which encloses an outer circumference of the inner tube 321, and an outer tube 323 which encloses an outer circumference of the rubber bushing 322. For example, the rubber bushing portion 32 may be formed by molding rubber between two steel tubes 321 and 323. As such, since the rubber bushing 32 is disposed between the inner tube 321 and the outer tube 323, the behavior for preventing vibration of the rubber bushing 322 can be more stable and equivalent generally.

Further, referring to FIG. 1, FIG. 3 and FIG. 5, the guide portion 3 may include a lubricative bushing portion 33 which is interposed between the guide hole 211 and the guide block 31 or between the guide hole 21 and the rubber bushing portion 32. That is, in case that the rubber bushing portion 32 is not provided to the guide portion 3, the lubricative bushing portion 33 may directly enclose the guide block 31, and in case that the rubber bushing portion 32 is provided to the guide portion 3, the lubricative bushing portion 33 may directly enclose the rubber bushing portion 32. By the lubricative bushing portion 33, the relative rotation between the guide portion 3 and the double yoke portion 2 can be more smoothly performed.

For example, the lubricative bushing portion 33 may include a thrust bearing 331 which encloses the guide block 31 or the rubber bushing portion 32, a lubricative plate 332 which is provided to enclose an outer circumference of the thrust bearing 331 and to contact an inner circumference of the guide hole 211 and includes a protrusion member 3321 which extends radially inwardly along a circumference at one end to enclose a circumference of one side surface of the guide block 31 or the rubber bushing portion 32, and a washer 333 which encloses a circumference of the other side surface of the guide block 31 or the rubber bushing portion 32. By the combination of the thrust bearing 331, the lubricative plate 332 and the washer 33, lubrication coating for the guide block 333 which is a relative rotation member inside the double yoke portion 2 can be added. Further, referring to FIG. 3 and FIG. 5, by the combination of the protrusion member 3321 of the lubricative plate 332 and the washer 333, the both side surfaces of the guide block 31 or the rubber bushing portion 32 can be uniformly supported, so clearance along an axis direction of the guide portion 3 can be removed so that the vibration along an axis direction can be prevented.

Further, referring to FIG. 3 and FIG. 5, a guide bushing 312 may be disposed inside the guide passage 311. The guide bushing 312 is a lubricative member, and guide to the protrusion member 121 of the shaft 12 can be more smoothly performed by the same so that an operation of the constant-velocity joint assembly can be improved.

Referring to (a) of FIG. 3 and FIG. 5, an elastic member 313 may be interposed between the respective protrusions 121 inside the guide passage 311. For example, the elastic member 313 may be a compression spring. Since the ends of the protrusions 121 of the first and the second shaft portions 1 and 1a are supported by both ends of the elastic member 313, the constant-velocity joint assembly 100 can more stably operate.

In another embodiment, referring to (b) of FIG. 3, a guide bearing 314 which has a shape of being capable of guiding the rotation of the respective protrusions 121 may be interposed between the respective protrusions 121 inside the guide passage 311. Since the rotation of the ends of the protrusions 121 of the first and the second shaft portions 1 and 1a is guided by both sides of the guide bearing 314, the resistance against rotation is reduced so that the constant-velocity joint assembly 100 can more stably operate.

Further, a spider rubber bushing 1112 may be disposed inside the spider hole 1111. That is, being seen in FIG. 3, by interposing the spider rubber bushing 1112 between the spider hole 1111 and the protrusion 121 of the shaft 12, noise which may be made during an operation of the constant-velocity joint assembly 100 can be prevented. For example, the spider rubber bushing 1112 has a ring shape in which a portion thereof is removed so as to have a slot. By such a slot, the spider rubber bushing 1112 can be assembled to contact an inner circumference of the spider hole 1111. In addition, the spider rubber bushing 1112 may be extended by being bent toward radially outwardly from the both sides of the spider hole 1111 by a predetermined length and a predetermined angle so as to be separated from the spider hole 1111.

Grooves 2111 are formed on both sides of the guide portion 3 in the guide hole 211, and the double yoke portion 2 may include a stopper member 23 which is inserted into the respective grooves 2111 to fix the position of the guide portion 3. That is, by assembling the stopper member 23 to the groove 2111, the rotation can be performed in a state that the position of the guide portion 3 which is assembled to the guide hole 211 inside the double yoke portion 2 is fixed.

The groove 2111 may be formed along a circumferential direction on an inner circumference of the guide hole 211, and may have a ring shape (i.e., C shape) in which a portion thereof is removed so as to have a slot. Since the stopper member 23 is provided with a slot, the stopper member 23 can be easily assembled to the groove 2111.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a constant-velocity assembly which is applied to a drive shaft of a vehicle and can be applied as a part of a vehicle so as to have an industrial applicability.

The invention claimed is:
1. A joint assembly comprising:
a first and a second shaft portions, wherein each of the first and second shaft portions has a shaft including a protrusion;
a double yoke portion in which a guide hole is formed along an axis direction, the first and the second shaft portions being respectively rotatably connected to both sides of the guide hole with an axis of an upper/lower direction; and
a guide portion which is disposed to the guide hole to guide the protrusion and rotates along an inner circumference of the guide hole during rotation of the first and second shaft portions,
wherein each of the first and the second shaft portions further comprises:
a spider body including a spider hole, a left leg and a right leg which are respectively protruded in a left and a right directions from the spider body, and an upper leg and a lower leg which are respectively protruded in an upward and a downward directions from the spider body to be connected to the double yoke portion; and
a yoke block comprising a block body,
wherein the yoke block is separately formed from the shaft and is connected to the shaft,
wherein the block body has a block hole, which is a through-hole, and the block body is connected to the shaft by the protrusion passing through the block hole and the spider hole,
wherein a left connecting member and a right connecting member are respectively protruded from a left side and a right side of the block body and respectively include a connecting hole to which the left leg and the right leg are rotatably connected, and
wherein the double yoke portion comprises:
a double yoke body including the guide hole; and
an upper connecting member and a lower connecting member, which are respectively protruded to both sides of the guide hole from an upper side and a lower side of the double yoke body and respectively include a connecting hole to which the upper leg and the lower leg are rotatably connected, and wherein grooves are respectively disposed on both sides of the guide portion in the guide hole, and wherein the double yoke portion comprises stopper members which are respectively inserted to the respective grooves to fix the position of the guide portion.

2. The joint assembly of claim 1, wherein the shaft and the yoke block are independently formed and assembled.

3. The joint assembly of claim 1, wherein the spider body further comprises a first needle bearing disposed between the left leg and the connecting hole of the left connecting member, a second needle bearing disposed between the right leg and the connecting hole of the right connecting member, a third needing bearing disposed between the upper leg and the connecting hole of the upper connecting member, and a fourth needle bearing disposed between the lower leg and the connecting hole of the lower connecting member.

4. The joint assembly of claim 1, wherein the guide portion comprises a guide block including a guide passage along an axis direction to enclose and guide the respective protrusions.

5. The joint assembly of claim 4, wherein the guide passage is disposed at a position where the respective protrusions are enclosed in accordance with an angle between the first and the second shaft portions and the double yoke portion.

6. The joint assembly of claim 4, wherein the guide portion comprises a lubricative bushing portion which is interposed between the guide hole and the guide block.

7. The joint assembly of claim 1, wherein a spider rubber bushing is disposed inside the spider hole.

8. The joint assembly of claim 1, wherein the groove is disposed along a circumferential direction on an inner circumference of the guide hole, and the stopper member has a ring shape in which a portion thereof is removed so as to have a slot.

9. A joint assembly comprising:
a first and a second shaft portions, wherein each of the first and second shaft portions has a shaft including a protrusion;
a double yoke portion in which a guide hole is formed along an axis direction, the first and the second shaft portions being respectively rotatably connected to both sides of the guide hole with an axis of an upper/lower direction; and
a guide portion which is disposed to the guide hole to guide the protrusion and rotates along an inner circumference of the guide hole during rotation of the first and second shaft portions,
wherein each of the first and the second shaft portions further comprises:
a spider body including a spider hole, a left leg and a right leg which are respectively protruded in a left and a right directions from the spider body, and an upper leg and a lower leg which are respectively protruded in an upward and a downward directions from the spider body to be connected to the double yoke portion;
a yoke block comprising a block body, wherein the yoke block is separately formed from the shaft and is connected to the shaft,
wherein the block body has a block hole, which is a through-hole, and the block body is connected to the shaft by the protrusion passing through the block hole and the spider hole,
wherein a left connecting member and a right connecting member are respectively protruded from a left side and a right side of the block body and respectively include a connecting hole to which the left leg and the right leg are rotatably connected,
wherein the guide portion comprises a guide block including a guide passage along an axis direction to enclose and guide the respective protrusions, and
wherein the guide portion comprises a rubber bushing portion which is interposed between the guide hole and the guide block.

10. The joint assembly of claim 9, wherein the rubber bushing comprises:
an inner tube which encloses an outer circumference of the guide block;
a rubber bushing which encloses an outer circumference of the inner tube; and
an outer tube which encloses an outer circumference of the rubber bushing.

11. The joint assembly of claim 9, wherein the guide portion further comprises a lubricative bushing portion which is interposed between the guide hole and the rubber bushing portion.

12. The joint assembly of claim 11, the lubricative bushing portion comprises:
a thrust bearing which encloses the rubber bushing portion;
a lubricative plate which is configured to enclose an outer circumference of the thrust bearing and to contact an inner circumference of the guide hole and comprises a protrusion member which extends radially inwardly along a circumference at one end to enclose a circumference of one side surface of the rubber bushing portion; and
a washer which encloses a circumference of another side surface of the rubber bushing portion.

13. The joint assembly of claim 9, wherein a guide bushing is disposed inside the guide passage.

14. The joint assembly of claim 9, wherein an elastic member is disposed between the respective protrusions inside the guide passage.

15. The joint assembly of claim 9, wherein a guide bearing having a shape configured to guide rotation of the respective protrusions is interposed between the respective protrusions inside the guide passage.

* * * * *